United States Patent
Hanson et al.

(10) Patent No.: US 7,589,930 B2
(45) Date of Patent: Sep. 15, 2009

(54) ZONE BASED REPEATED RUNOUT ERROR COMPENSATION

(75) Inventors: Reed D. Hanson, Chaska, MN (US); Thomas C. Zirps, Minneapolis, MN (US); Peng Yan, Bloomington, MN (US); Samir Mittal, Eden Prairie, MN (US); Timothy F. Ellis, Tonka Bay, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 37 days.

(21) Appl. No.: 11/724,124

(22) Filed: Mar. 14, 2007

(65) Prior Publication Data
US 2008/0225654 A1    Sep. 18, 2008

(51) Int. Cl.
G11B 5/596    (2006.01)
(52) U.S. Cl. .......................... 360/77.04; 360/48
(58) Field of Classification Search .................. None
See application file for complete search history.

(56) References Cited

U.S. PATENT DOCUMENTS

| | | | |
|---|---|---|---|
| 5,949,605 A | 9/1999 | Lee et al. | |
| 5,995,316 A | 11/1999 | Stich | |
| 6,549,362 B1 | 4/2003 | Melrose et al. | |
| 6,747,835 B2 | 6/2004 | AbouJaoude et al. | |
| 6,765,748 B2 * | 7/2004 | Shu | 360/77.04 |
| 6,862,155 B2 * | 3/2005 | Yang et al. | 360/77.02 |
| 6,898,047 B2 | 5/2005 | Shishida et al. | |
| 6,947,249 B1 | 9/2005 | Hargarten et al. | |
| 6,970,320 B2 * | 11/2005 | Sugiyama et al. | 360/75 |
| 6,972,922 B1 | 12/2005 | Subrahmanyam et al. | |
| 7,027,256 B1 * | 4/2006 | Subrahmanyam et al. | 360/77.08 |
| 7,106,547 B1 | 9/2006 | Hargarten et al. | |
| 7,151,645 B2 | 12/2006 | Won et al. | |
| 7,196,864 B1 * | 3/2007 | Yi et al. | 360/77.04 |
| 7,372,658 B2 * | 5/2008 | Takaishi | 360/77.04 |
| 2002/0027729 A1 | 3/2002 | Siew et al. | |
| 2007/0253094 A1 * | 11/2007 | Hara | 360/77.08 |

* cited by examiner

*Primary Examiner*—Jason C Olson
(74) *Attorney, Agent, or Firm*—Fellers, Snider, et al.

(57) ABSTRACT

Compensation for repeated runout (RRO) error, such as in a data storage device servo circuit, is preferably carried out by obtaining a population distribution of RRO error values from at least selected ones of a subset of tracks. An RRO error compensation value is determined for each one of the subset of tracks when a variance characteristic of said population distribution meets a selected criterion. Preferably, a first track of a storage medium has a servo field at a first angular position on the medium, a repeated runout (RRO) error compensation field at a second angular position on the medium, and a user data field at a third angular position on the medium. An immediately adjacent second track preferably has a servo field at the first angular position and a user data field at the second angular position in lieu of an RRO error compensation field.

16 Claims, 7 Drawing Sheets

ZONE BASED REPEATED RUNOUT ERROR COMPENSATION

BACKGROUND

The presence of repeated runout (RRO) error can adversely affect the ability of a control system to correctly position a control object. RRO error generally comprises repetitive error in an observed state, such as "once-around" errors that are exhibited during each revolution in a rotating system.

Some data storage devices utilize servo data written to one or more rotatable storage media to provide servo positioning information. This information provides feedback to a closed loop servo circuit that operates to position a transducer adjacent tracks on the media. Misalignments of the servo data can produce RRO error in the observed actual position of the transducer, thereby reducing servo control margins.

Error compensation techniques, such as the application of zero acceleration path (ZAP) processing, can be applied in an effort to reduce the effects of such misalignments. Such processing, however, can be time and computationally intensive.

SUMMARY

In accordance with preferred embodiments, a population distribution of repeated runout (RRO) error values is obtained from at least selected ones of a subset of tracks. An RRO error compensation value is determined for each one of the subset of tracks when a variance characteristic of said population distribution meets a selected criterion.

DETAILED DESCRIPTION

Figure 1:
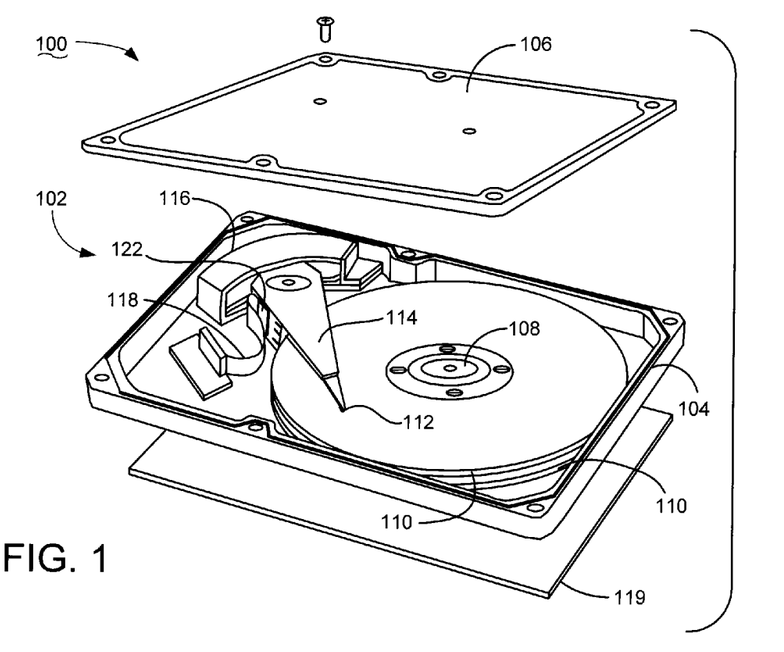
FIG. 1 is an exploded isometric view of an exemplary data storage device in which preferred embodiments of the present invention can be advantageously practiced.

FIG. 1 provides a top plan view of a data storage device 100. The device 100 is provided to show an exemplary environment in which preferred embodiments of the present invention can be advantageously practiced. It will be understood, however, that the claimed invention is not so limited.

The device 100 includes a substantially sealed housing 102 formed from a base deck 104 and top cover 106. An internally disposed spindle motor 108 is configured to rotate a number of storage media 110. The media 110 are accessed by a corresponding array of data transducers 112. While FIG. 1 shows the use of two magnetic recording discs and four corresponding heads, other numbers of heads and discs (such as a single disc, etc.), as well as other types of media can readily be utilized in the device 100 as desired.

A head-stack assembly ("HSA" or "actuator") is shown at 1114. The actuator 114 preferably rotates through application of current to a voice coil motor (VCM) 116. Controlled operation of the VCM 116 causes the transducers 112 to align with tracks defined on the media surfaces to store data thereto or retrieve data therefrom.

A flex circuit assembly 118 provides electrical communication paths between the actuator 114 and device control electronics on an externally disposed printed circuit board (PCB) 119. The flex circuit assembly 118 preferably includes VCM signal paths to accommodate the application of current to the VCM 116, and I/O signal paths to accommodate the transfer of write data to the media 110 and readback data from the media 110, respectively.

Figure 2:
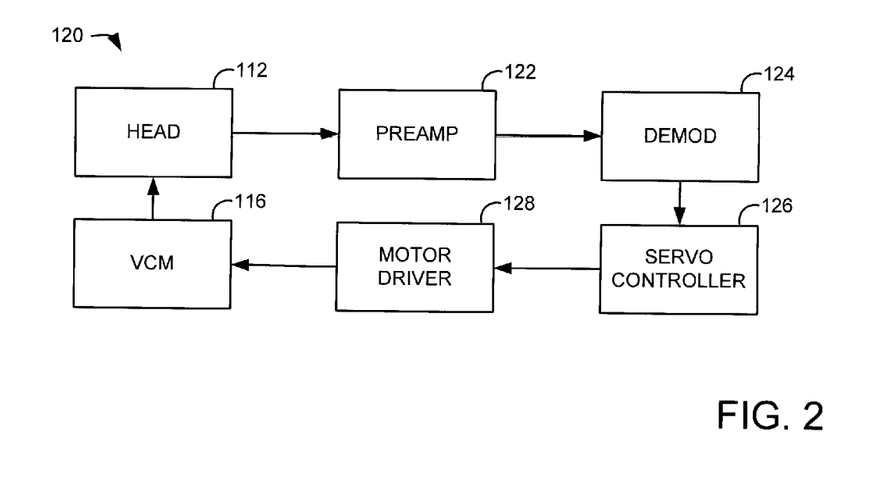
FIG. 2 provides a functional representation of a closed loop servo control circuit of the device of FIG. 1.

FIG. 2 provides a generalized functional block diagram for a closed loop servo control circuit 120 of the device 100. Preferably, embedded servo data are transduced from the media 110 by a selected transducer (head) 112 and provided to a preamplifier/driver (preamp) circuit 122. The preamp circuit 122 is preferably mounted to the side of the actuator 114, as shown in FIG. 1.

The preamp circuit 122 preamplifies and filters the readback signals from the transducer 112, and provides the processed servo data to a demodulation (demod) circuit 124. The demod circuit 124 is preferably disposed on the device PCB 119, and operates to detect and conditions the servo data, including application of automatic gain control (AGC) and conversion of the signals to digital form.

A servo controller 126 processes the digitized servo data to generate a current command signal that is supplied to a motor driver circuit 128. In response, the driver circuit 128 applies the appropriate current to the VCM 116 to position the transducer 112.

The servo controller 126 is preferably characterized as a programmable processor with associated servo code to direct the operation of the servo loop. The controller 126 generally operates in two primary modes, seeking and track following. Seeking generally involves controlled movement of the selected transducer 112 from an initial track to a destination track. Track following generally comprises operation of the controller 126 to maintain the selected transducer 112 over the center (or other commanded position) a selected track in order to carry out data I/O operations with the track.

Figure 3:
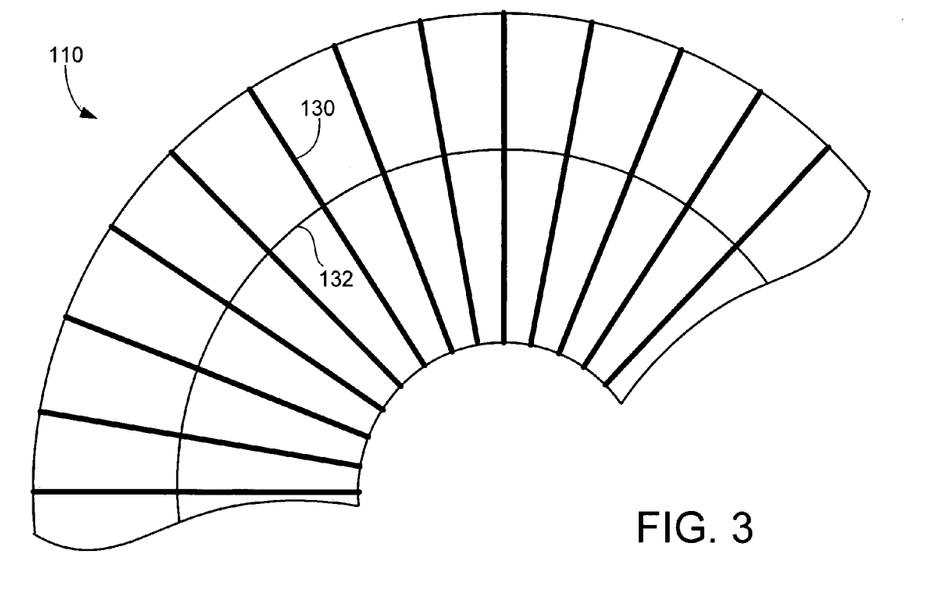
FIG. 3 illustrates a portion of a selected storage medium of FIG. 1 to set forth a preferred arrangement for servo data placed thereon.

FIG. 3 shows a portion of a selected medium 110 from FIG. 1 to illustrate a preferred manner in which servo data are arranged thereon for use by the servo circuit 120 of FIG. 2. A number of spaced apart, radially extending servo wedges 130 extend across the recording surfaces like spokes of a wheel. The servo data are preferably formed during device manufacturing, such as from the use of a servo track writer (STW) station or a self-servo writing operation.

Figure 4:
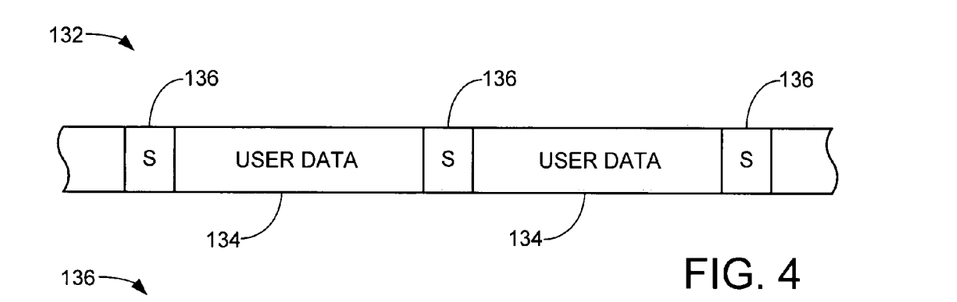
FIG. 4 represents a preferred generalized format for a data track of the device of FIG. 1.

An exemplary data track is shown at 132. The data track 132 circumferentially extends about the medium, preferably in the form of a concentric circle although the track could alternatively form a portion of a helical spiral. As shown in FIG. 4, user data are stored in intervening regions 134 along the track 132 between adjacent servo fields 136 of the wedges 130. Addressable data sectors (not separately shown) are defined in the regions 134 during a device formatting operation to store fixed amounts of user data (e.g., 512 bytes each).

Figure 5:
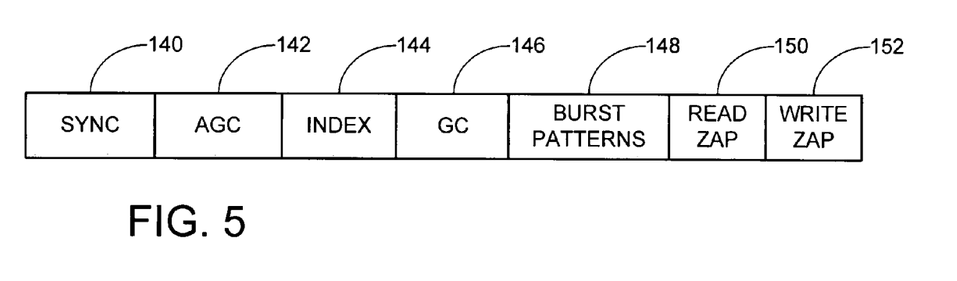
FIG. 5 provides a generalize representation of a preferred format for a servo field of the device.

FIG. 5 shows a preferred arrangement for a selected servo field 136 of FIG. 4, although other arrangements can readily be used. It will be appreciated that each of the wedges 132 of FIG. 3 preferably comprise a succession of immediately adjacent, angularly aligned servo fields 136. It will further be appreciated that the data tracks such as 132 can be arbitrarily defined with respect to the servo data fields 136.

The servo field 136 is shown in FIG. 5 to preferably include a synchronization (sync) field 140 with a unique pattern to enable the servo circuit 120 to detect commencement of the servo field. An automatic gain control (AGC) field 142 allows the demodulation circuitry to establish appropriate gain and frequency settings to prepare the circuit to decode the remainder of the servo data.

An index field 144 provides an indication of angular position of the associated servo wedge 132. A Grey code (GC) field 146 provides a unique track address, and burst pattern field 148 includes a succession of radially extending dibit patterns (e.g., AB, ABCD, ABCDEF, etc.) to provide intratrack positional alignment. Preferably, an AB null pattern is used with adjacent A and B patterns to provide servo seams (junctions) at nominally precise locations. Such is not limiting, however, as the servo patterns can take any number of configurations as desired.

A read zero acceleration path (ZAP) field 150 and a write ZAP field 152 are also shown. As explained in greater detail below, these fields respectively store compensation values that are used by the servo circuit 120 during servo processing to reduce the effects of repeated runout (RRO) error associated with misalignments of the servo seams.

Figure 6:
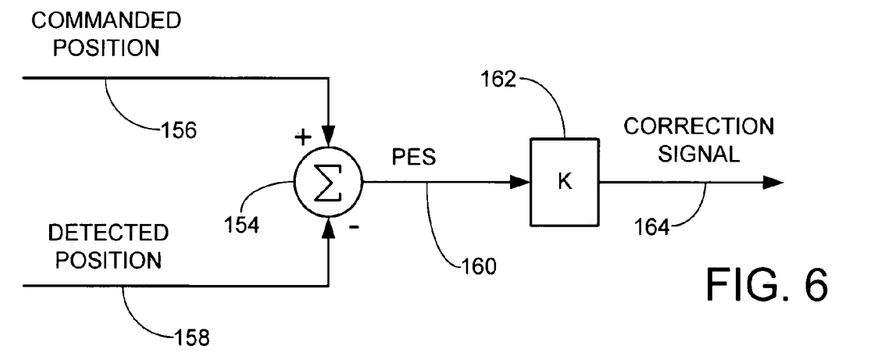
FIG. 6 shows a simplified control diagram of the servo circuit of FIG. 2 to generally illustrate a preferred manner in which a position error signal (PES) is generated to provide control for transducer positioning.

FIG. 6 sets forth a generalized functional diagram of relevant portions of the servo circuit 120 of FIG. 2. A summing junction 154 combines a commanded (desired) position for a selected transducer 112 on path 156 with the detected position on path 158 to output a position error signal (PES), path 160. The PES generally indicates a radial positioning distance error for the transducer, and the servo circuit 120 generally operates to adjust the current applied to the VCM 116 to reduce this error.

For example, as shown in FIG. 6, the PES on path 160 is combined with a gain K of block 162 to provide a correction signal on path 164. The current output from the motor driver 128 can then be adjusted in relation to this correction signal. Other and more complex forms of signal processing of the PES can readily be applied, however, depending on the requirements of a given application.

Figure 7:
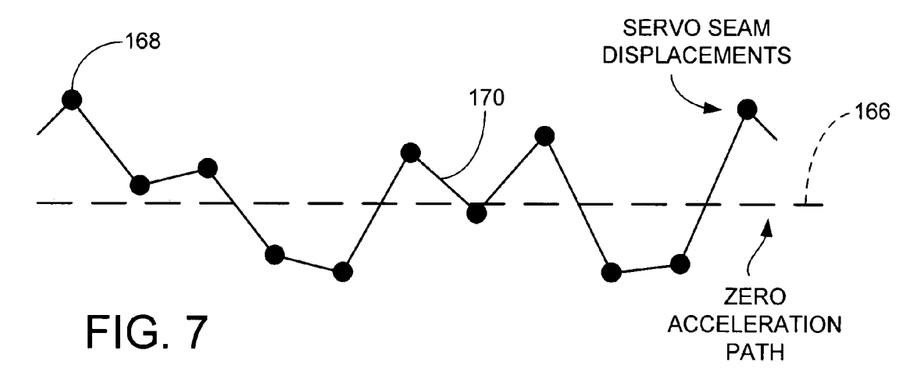
FIG. 7 generally represents servo seam misplacements in the servo data as well as a zero acceleration path (ZAP) representing an ideal trajectory for the transducer along a selected track.

FIG. 7 provides a dashed line 166 to generally illustrate a desired trajectory for a selected transducer along an associated track. Points 168 generally represent the positional data provided by the servo fields along the track, and the distance between each point 168 and the dashed line 166 generally represents misalignment error in the servo seams from an ideal position (i.e., along line 166).

Segmented line 170 generally represents a trajectory that the servo circuit may attempt to take as it follows the uncompensated servo data of points 168. The uncompensated trajectory will include a measure of RRO error, since the misplacement errors will reoccur during each revolution of the associated medium.

Figure 8:
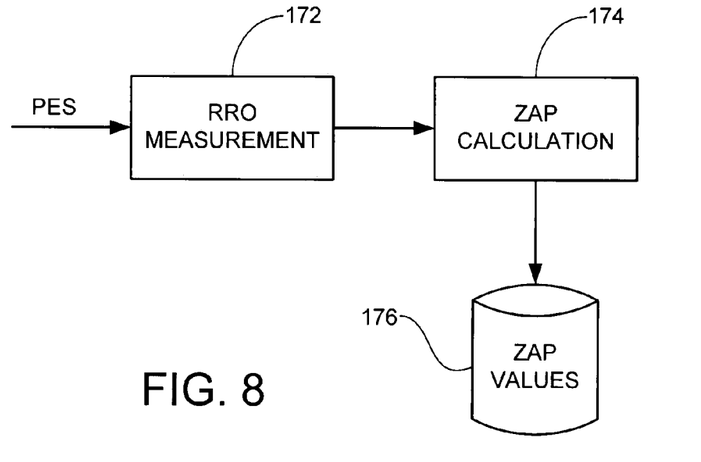
FIG. 8 is a simplified functional representation of portions of the servo circuit configured to compensate for the misalignment errors of FIG. 7.

In order to reduce this RRO error, ZAP processing is preferably carried out by the servo circuit 120 as generally set forth by FIG. 8. An RRO measurement block 172 initially characterizes the RRO error for each servo field. A number of well known techniques can be applied, such as by commanding one (or more) constant positions and observing the relative placements of adjacent seams at the commanded position(s).

Once the RRO error has been characterized, a ZAP calculation block 174 preferably operates to determine appropriate RRO error compensation values (e.g., ZAP values) that are stored in memory 176 and subsequently applied to compensate for the RRO error and follow the ZAP path 166 in FIG. 7. Preferably, separate write ZAP and read ZAP values are calculated to provide compensation during respective writing and reading operations, to account for reader/writer offsets in the transducer. These ZAP values are preferably stored in non-volatile memory, such as the fields 150, 152 in FIG. 5.

While operable, RRO error compensation efforts such as the foregoing exemplary ZAP process can be time and computationally intensive. Devices such as 100 of the present generation can have several hundred thousand tracks or more on each recording surface, and the requisite ZAP processing can require multiple revolutions of the media for each track. Moreover, since RRO errors are often localized, the variance of RRO can vary significantly on the same medium; that is, some tracks can exhibit significant amounts of RRO while others do not.

Figure 9:
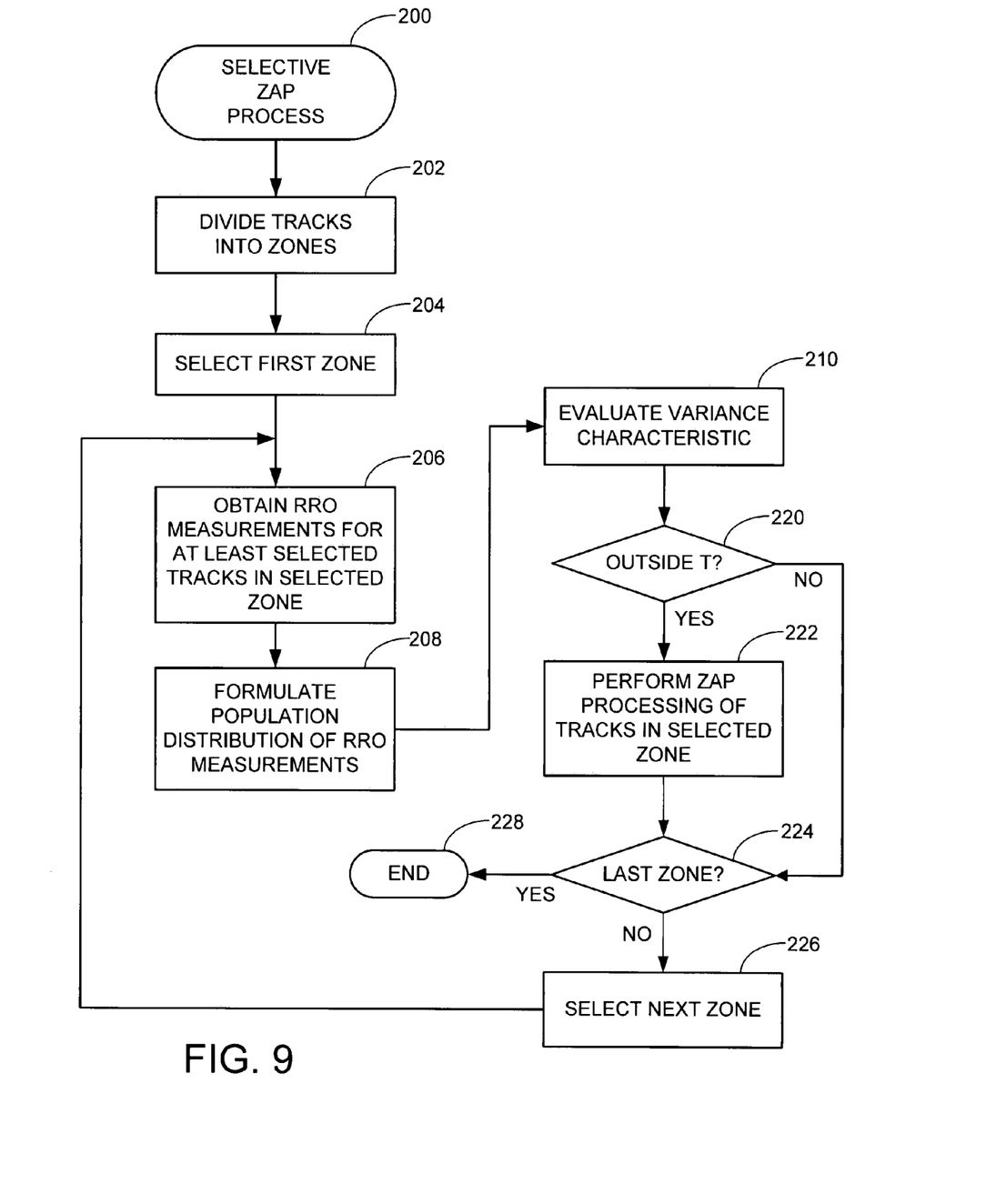
FIG. 9 is a flow chart for a SELECTIVE ZAP PROCESS routine, generally illustrative of steps carried out in accordance with preferred embodiments of the present invention.

Accordingly, FIG. 9 provides a flow chart for a SELECTIVE ZAP PROCESSING routine 200, generally representative of steps carried out in accordance with preferred embodiments of the present invention, such as but not limited to the device 100 of FIG. 1.

Figure 10:
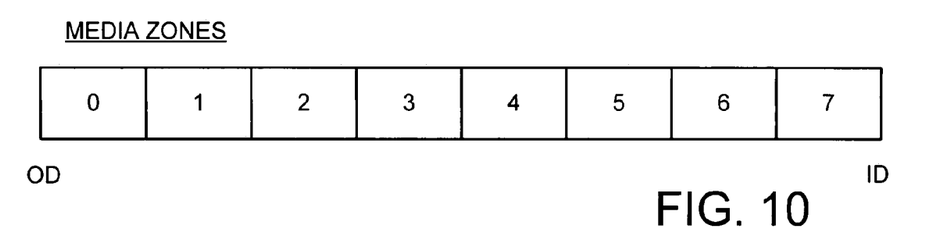
FIG. 10 shows an exemplary grouping of tracks of the device into a number of zones in accordance with the routine of FIG. 9.

At step 202, a plurality of zones, or subsets, of tracks are first preferably defined. FIG. 10 shows an exemplary set of eight such zones 0-7, extending from an outermost diameter (OD) to an innermost diameter (ID) of the media 110. In FIG. 10, each of the zones generally has the same number of tracks, although such is not required. For example, in devices that employ constant density recording zones in which all of the user data in a zone are recorded at nominally the same frequency, each such zone could be selected as a different zone for use by the routine 200.

It will be appreciated at this point that the routine of FIG. 10 is not necessarily limited to data storage devices, but can be utilized with any number of different types of control systems. Thus, reference to "tracks" will be understood broadly to define different trajectory paths of a control object and are not necessarily limited to paths that involve the recording or readback of data.

Once the plurality of zones has been defined in step 202, a first zone is selected at step 204 for processing. Preferably, RRO measurements are obtained for at least selected ones of the tracks of the selected zone at step 206. The RRO measurements of step 206 generally relate to a characterization of the RRO error associated therewith, and can be obtained in any number of ways, such as discussed above with reference to FIGS. 7-8. It is noted that selected ones of the tracks in the selected zone are evaluated; this can be all of the tracks in the zone, or can be limited to a statistically significant sample thereof.

Preferably, the RRO measurements of step 206 are carried out efficiently from a time requirement standpoint. In the context of the exemplary device 100, one preferred approach determines the RRO in relation to measured PES over a minimal number of revolutions. Generally, it has been found that the available PES to make a valid determination is limited to $N_1$ revolutions of the medium 110, where $$N_1 = \left\{ \frac{V_{NRRO}}{V_{TARGET\_RRO\_ERROR}} \right. \quad (1)$$

where V is variance of the associated variable, and NRRO is non-repeatable runout (NRRO) error. RRO and NRRO will generally be independent random variables.

The variance experienced in a given PES signal will generally be a combination of the variance from RRO and the variance from NRRO, or $$V_{PES} = V_{RRO} + V_{NRRO} \quad (2)$$

NRRO variance can be determined in a variety of ways, such as based on a weighted average of a number of evaluated (audited) tracks. An NRRO variance value is preferably obtained during the application of other manufacturing processes to the device. Thus, equation (2) can be rearranged as $$\tilde{V}_{RRO\_N_1}(k,i) = V_{PES\_N_1}(k,i) - V_{NRRO}(k,i) \quad (3)$$

where Trk_min(i)≤k≤Trk_max(i) in which Trk_min(i) and Trk_max(i) are boundary tracks of zone i.

Equation (3) can be used to provide a grand distribution of estimated RRO variance for each zone. A grand mean of variance of the RRO distribution can be estimated as follows:

$$V_{EST\_GRAND\_RRO}(i) := (\Sigma_{k=1}^{N} \tilde{V}_{RRO\_N_i}(k,i))/N \quad (4)$$

where $V_{EST\_GRAND\_RRO}$ is the grand estimate of RRO variance for zone i. It has been found that equation (4) can provide be a reasonably accurate estimate of the true RRO variance for the zone.

Continuing with the routine of FIG. 9, the variance is next evaluated at step 210 to determine whether the RRO is sufficient to warrant the application of ZAP processing to the tracks of the selected zone. In a preferred embodiment, a criterion is generated based on the estimate of RRO variance, such as a criterion proportional to sigma σ (standard deviation) of the RRO estimate. For example, zap processing can be required if the following relationship is satisfied:

$$r(m)\sqrt{V_{EST\_GRAND\_RRO}(i)} > m\ \% \quad (5)$$

where m is a ZAP threshold value (in percent), and r(m) is a proportional constant related to m.

Figure 11:
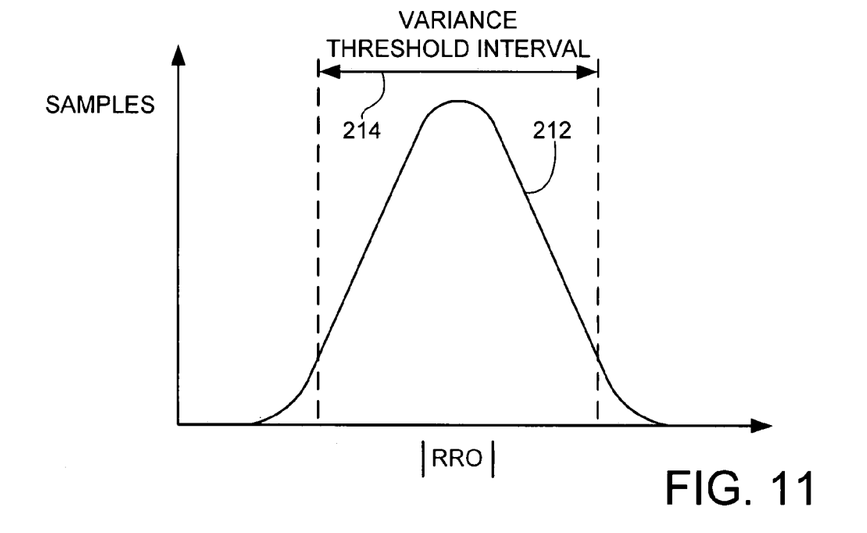
FIG. 11 is a graphical representation of a first population distribution of RRO measurements obtained in accordance with the routine of FIG. 9.
Figure 12:
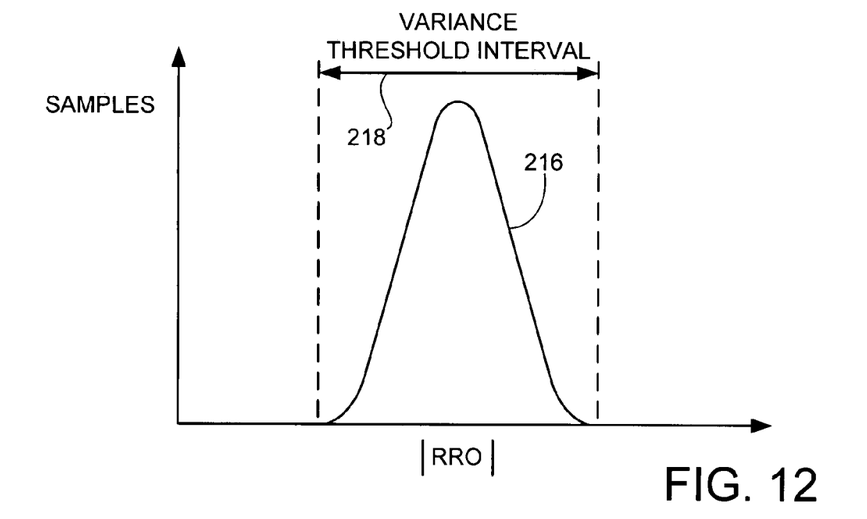
FIG. 12 is a graphical representation of a second population distribution of RRO measurements obtained in accordance with the routine of FIG. 9.

The evaluation of step 210 is generally represented in a graphical format in FIGS. 11 and 12. FIG. 11 provides an RRO variance distribution curve 212 for a first zone. The curve 212 generally represents a plot of accumulated RRO values v. number of samples (tracks from the first zone). A suitable variance threshold interval is generally represented at 214, and the zone is identified as requiring ZAP processing on the basis that the RRO variation exceeds this threshold interval. It will be appreciated that other variance characteristics and associated thresholds can readily be used as desired.

By contrast, a second RRO distribution curve 216 for a second zone is generally set forth in FIG. 12. The second zone is determined to not require ZAP processing on the basis that the distribution 216 does not exceed an associated variance threshold interval 218. It will be noted that the population distributions depicted in FIGS. 11 and 12 are merely exemplary in nature and may take any number of forms during actual processing.

Returning to the flow of FIG. 9, the foregoing steps are generally depicted by the operation of decision step 220 and ZAP processing step 222. Decision step 224 inquires whether additional zones are pending; if so, the next zone is selected at step 226 and the above steps are repeated for the next selected zone. Once all zones have been evaluated in turn, the process ends at step 228.

It has generally been found that the operation of the routine of FIG. 9 can significantly reduce the overall processing time required to process a device such as 100. In one example, it was found that time savings of as much as 37% of the overall ZAP processing time could be achieved as compared to performing 100% ZAP processing of all tracks. In the above example, write ZAP values were determined for all tracks, while selective ZAP processing was applied to generate read ZAP values for only selected tracks. It is contemplated that in other embodiments, both write ZAP and read ZAP values can be omitted for selected tracks exhibiting sufficiently low RRO variance, leading to further processing time savings.

Figure 13:
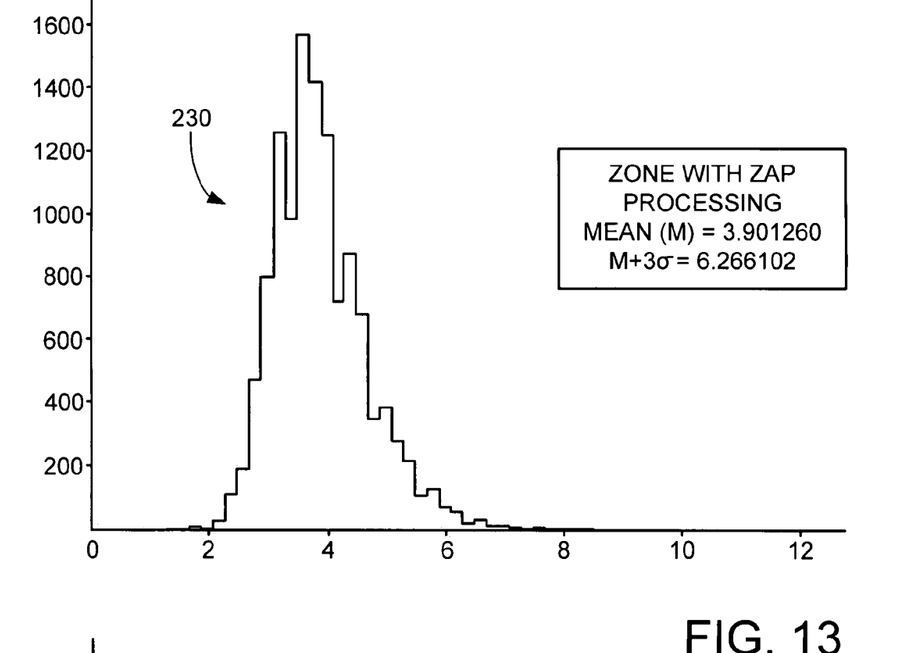
FIG. 13 graphically represents a population distribution for a selected zone after the application of ZAP processing in accordance with the routine of FIG. 9.
Figure 14:
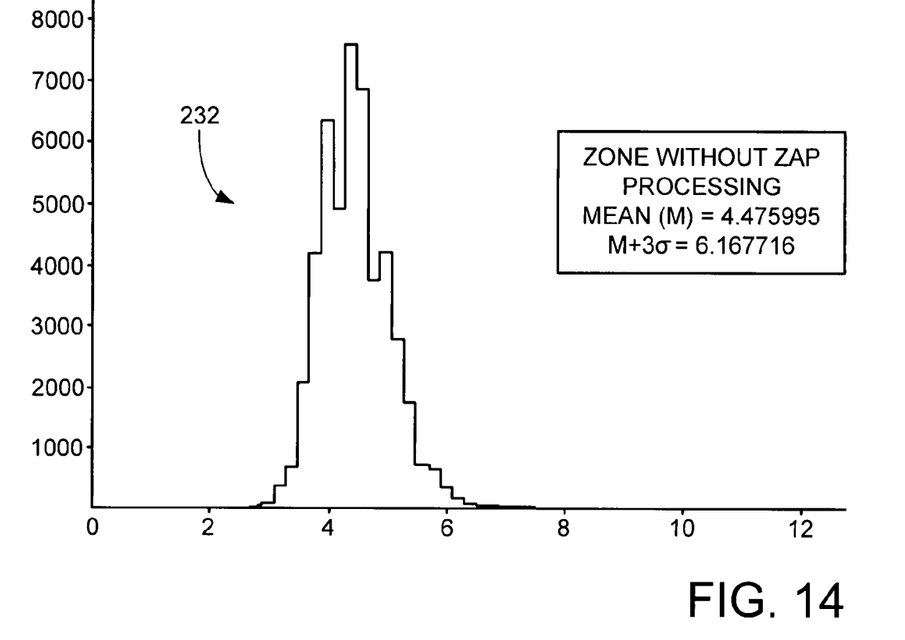
FIG. 14 graphical represents a population distribution for a selected zone that did not require the application of ZAP processing, wherein the unprocessed distribution of FIG. 14 is generally similar to the processed distribution of FIG. 13.

FIGS. 13 and 14 serve to generally illustrate exemplary improvements obtained through the application of the routine of FIG. 9. FIG. 13 provides a resulting RRO variance grand distribution curve 230 obtained after the application of ZAP processing. As shown in FIG. 13, the mean (M) value for the population distribution was determined as M=3.901260, and an M+3σ interval was determined as 6.266102.

These values compare favorably to another RRO variance grand distribution curve 232 in FIG. 14 for a zone that was not subjected to ZAP processing. The associated values for the curve 232 are M=4.475995 and M+3σ=6.167716, respectively. From FIGS. 13 and 14 it can be seen that the selective application of ZAP processing as disclosed herein can advantageously result in substantially consistent levels of RRO error for all the zones across the device.

Figure 15:
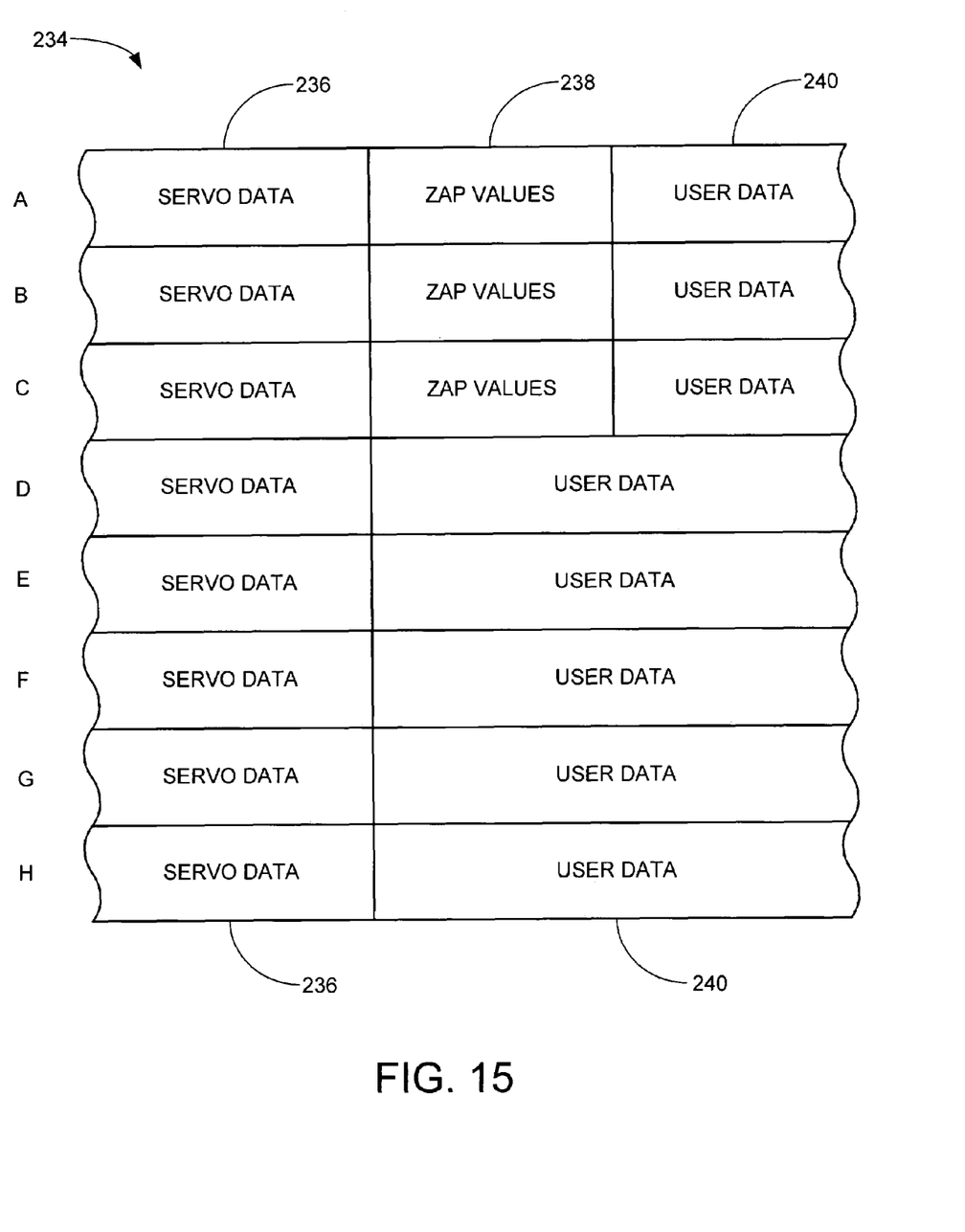
FIG. 15 depicts a preferred format for a number of adjacent tracks of the device of FIG. 1.

Another advantage that can arise from the use of the routine 200 of FIG. 9 is the ability to reduce the overhead associated with the ZAP values for those zones in which the ZAP values are unnecessary. By way of illustration, FIG. 15 shows portions of a number of immediately adjacent data tracks 234 on a selected recording surface of the device 100. The tracks are individually identified in FIG. 15 as tracks A-H.

It is contemplated that the first three tracks A-C form a portion of a first zone to which ZAP processing has been applied as a result of the application of the routine 200 of FIG. 9. Each of the first zone tracks A-C is thus shown to include the tail end of a servo data field 236 at a first angular position, a ZAP values field 238 at a second angular position to accommodate read and write ZAP compensation values, and the beginning portion of a user data area 240 at a third angular position to accommodate user data.

By contrast, the last four tracks D-H in FIG. 15 form a portion of an adjacent second zone that was not been subjected to ZAP processing by the routine of FIG. 9. Unlike the tracks A-C, the tracks D-H do not have a ZAP values field following each servo wedge. Rather, the user data areas 240 immediately follow the servo data fields 236 at the second angular position (and extend through the third angular position as before). In this way, the areas that would have otherwise accommodated the ZAP values fields can now used to store additional user data.

While any individual one of these areas is relatively small, the total amount of additional capacity can add up to a significant amount of additional storage, based on the number of tracks that do not require ZAP processing and the number of servo wedges per track.

It will further be noted that ZAP values can be stored in other areas of the device, such as solid-state memory, rather than on the media 110. In such cases, reducing the total number of ZAP values to only those tracks that require the same can lead to decreased component costs and processing complexity.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising steps of forming a population distribution of repeated runout (RRO) error values from at least selected ones of an overall subset of tracks located on a storage medium, wherein a first track forms a first subset of immediately adjacent tracks each nominally identical in servo format to the first track, wherein a second track forms a second subset of immediately adjacent tracks each nominally identical to the second track, and determining an RRO error compensation value comprising a write zero acceleration path (ZAP) value for each track in the first subset of tracks and an RRO compensation value comprising a write ZAP value and a read ZAP value for the second subset of tracks when a variance characteristic of said population distribution meets a selected criterion.

2. The method of claim 1, further comprising separately carrying out the forming and determining steps on each of the first and second subsets of tracks, wherein RRO error compensation values are not determined for at least one of the plurality of subsets of tracks.

3. The method of claim 1, wherein the determining step further comprises storing the RRO error compensation values in memory.

4. The method of claim 3, wherein the memory comprises a compensation value field at a selected location adjacent an embedded servo field on a rotatable storage medium, and wherein user data are stored in the compensation value field in lieu of an RRO error compensation value when the variance characteristic of said population distribution does not meet the selected criterion.

5. The method of claim 1, wherein the overall subset of tracks comprises a set of data tracks on a rotatable storage medium of a data storage device, wherein at least one additional data track on the storage medium is not included in the overall subset of tracks.

6. The method of claim 5, wherein each of the tracks of the overall subset of tracks records user data at a nominally same frequency, and wherein the at least one additional data track records user data a different frequency.

7. The method of claim 1, wherein the forming step comprises determining an estimated RRO variance in relation to an estimated non-repeatable runout (NRRO) variance and a position error signal (PES).

8. The method of claim 1, wherein each track of the overall subset of tracks comprises a plurality of spaced apart embedded servo fields, and wherein the determining step comprises providing a separate RRO error compensation value for each of the servo fields.

9. An apparatus comprising a servo circuit configured to form a population distribution of repeated runout (RRO) error values from at least selected ones of a an overall subset of tracks on which a plurality of data tracks are formed, wherein a first track forms a first subset of immediately adjacent tracks each nominally identical in servo format to the first track, wherein a second track forms a second subset of immediately adjacent tracks each nominally identical to the second track, and to determine an RRO error compensation value comprising a write zero acceleration path (ZAP) value for each track in the first subset of tracks and an RRO compensation value comprising a write ZAP value and a read ZAP value for the second subset of tracks when a variance characteristic of said population distribution meets a selected criterion.

10. The apparatus of claim 9, wherein the servo circuit is further configured to separately carry out said forming and determining operations on each of the overall subsets of tracks, wherein RRO error compensation values are not determined for at least one of the plurality of subsets of tracks.

11. The apparatus of claim 9, wherein the servo circuit further stores the RRO error compensation values in memory.

12. The apparatus of claim 11, wherein the memory comprises a compensation value field at a selected location adjacent an embedded servo field on a rotatable storage medium, and wherein user data are stored in the compensation value field in lieu of an RRO error compensation value when the variance characteristic of said population distribution does not meet the selected criterion.

13. The apparatus of claim 9, wherein the overall subset of tracks comprises a set of data tracks on a rotatable storage medium of a data storage device, and wherein at least one additional data track on the storage medium is not included in the overall subset of tracks.

14. The apparatus of claim 13, wherein each of the tracks of the overall subset of tracks records user data at a nominally same frequency, and wherein the at least one additional data track records user data a different frequency.

15. The apparatus of claim 9, wherein the servo circuit determines the RRO error value in relation to an estimated non-repeatable runout (NRRO) value and a position error signal (PES).

16. The apparatus of claim 9, wherein each track of the overall subset of tracks comprises a plurality of spaced apart embedded servo fields, and wherein the servo circuit provides a separate RRO error compensation value for each of the servo fields.

* * * * *